(12) United States Patent
Oelsch

(10) Patent No.: US 7,416,652 B2
(45) Date of Patent: Aug. 26, 2008

(54) METHOD FOR MANUFACTURING AN ELECTRODE FOR THE ELECTROCHEMICAL MACHINING OF A WORKPIECE AND AN ELECTRODE MANUFACTURED ACCORDING TO THIS METHOD

(75) Inventor: Jürgen Oelsch, Hohenroth (DE)

(73) Assignee: Minebea Co., Ltd., Nagano-ken (JP)

( * ) Notice: Subject to any disclaimer, the term of this patent is extended or adjusted under 35 U.S.C. 154(b) by 416 days.

(21) Appl. No.: 10/504,523

(22) PCT Filed: Feb. 11, 2003

(86) PCT No.: PCT/EP03/01344

§ 371 (c)(1),
(2), (4) Date: Aug. 16, 2004

(87) PCT Pub. No.: WO03/068440

PCT Pub. Date: Aug. 1, 2003

(65) Prior Publication Data

US 2005/0082173 A1 Apr. 21, 2005

(30) Foreign Application Priority Data

Feb. 15, 2002 (DE) ................. 102 06 408
Aug. 14, 2002 (DE) ................. 102 37 324

(51) Int. Cl.
*B23H 7/22* (2006.01)

(52) U.S. Cl. ................. 205/640; 204/290.01

(58) Field of Classification Search ............ 205/648, 205/640; 204/224 R, 290.01
See application file for complete search history.

(56) References Cited

U.S. PATENT DOCUMENTS

| 2,417,468 | A | * | 3/1947 | Canziani et al. | ............... 134/28 |
| 3,156,976 | A | * | 11/1964 | Whiting | ............... 228/131 |
| 3,984,911 | A | * | 10/1976 | Krug et al. | ............... 29/424 |
| 4,133,730 | A | * | 1/1979 | Du Bois et al. | ............... 205/511 |
| 4,656,010 | A | * | 4/1987 | Leitzke et al. | ............ 422/186.18 |
| 6,267,868 | B1 | * | 7/2001 | Wei et al. | ............... 205/648 |
| 2001/0003697 | A1 | * | 6/2001 | Jennings et al. | ............... 451/36 |

OTHER PUBLICATIONS

Davis et al., The ASM Handbook, Oct. 31, 1990, vol. 2, p. 282.*

* cited by examiner

*Primary Examiner*—John P. Sheehan
*Assistant Examiner*—Jessee R. Roe
(74) *Attorney, Agent, or Firm*—Duane Morris LLP

(57) ABSTRACT

The invention relates to a method for manufacturing a tool electrode for the electrochemical machining of workpieces, particularly for components for fluid bearings with the following processing steps: (a) Providing an electrode body made of a conductive base material which has an essentially smooth surface; (b) Coating the surface of the electrode body with an insulating material; (c) Removing the insulating material from locations on the surface of the electrode body that correspond to a pattern which is to be formed on the surface of the piece by means of electromechanical machining.

28 Claims, 3 Drawing Sheets

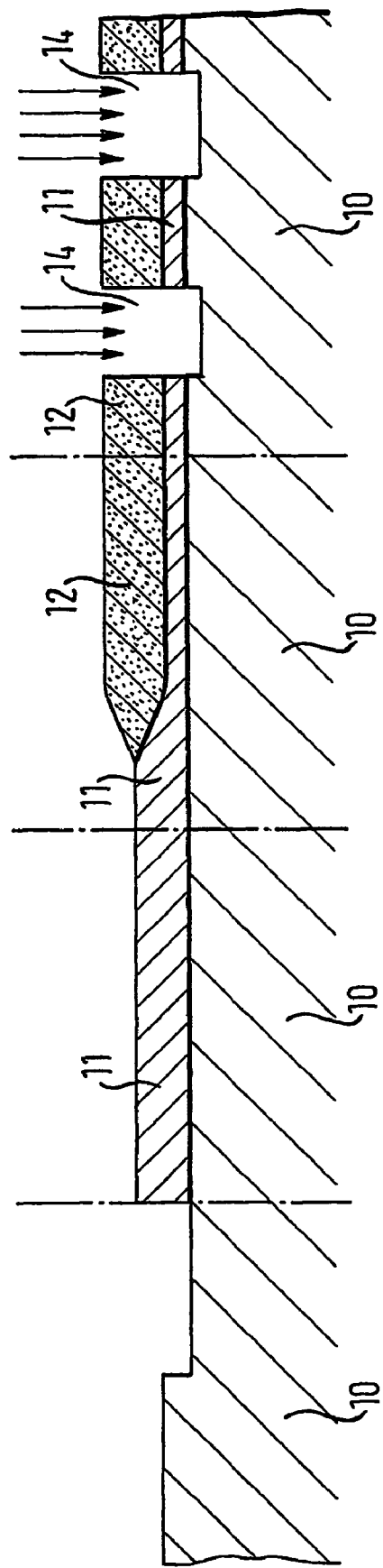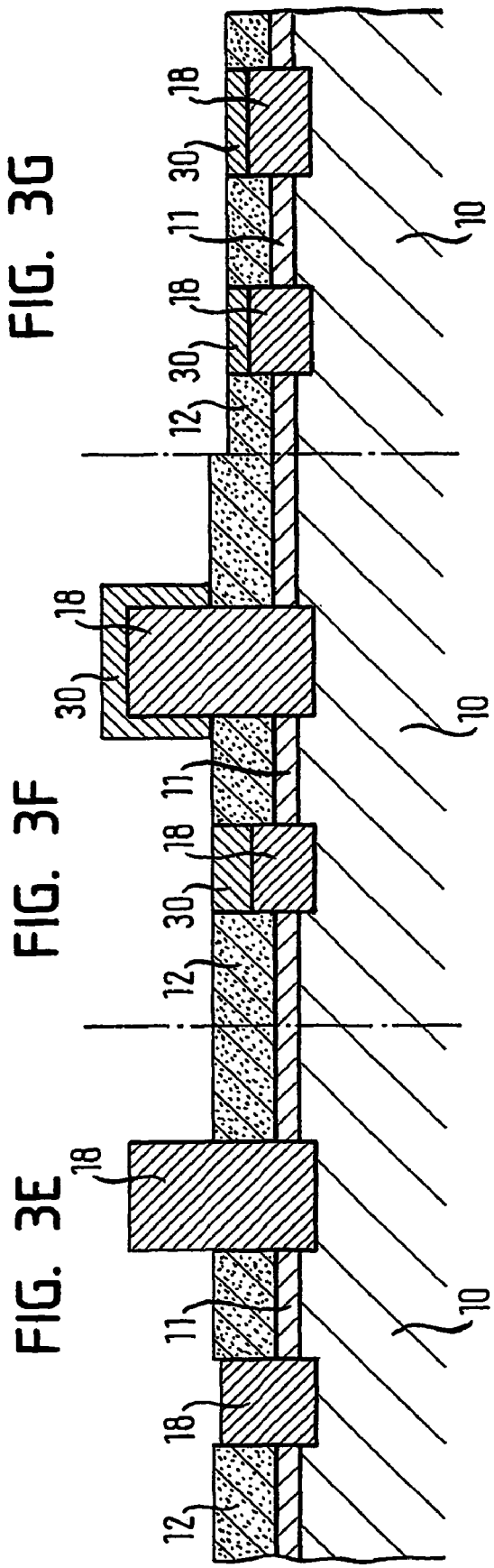

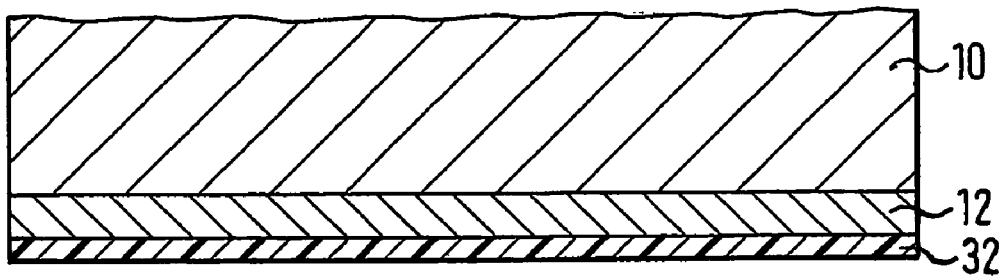
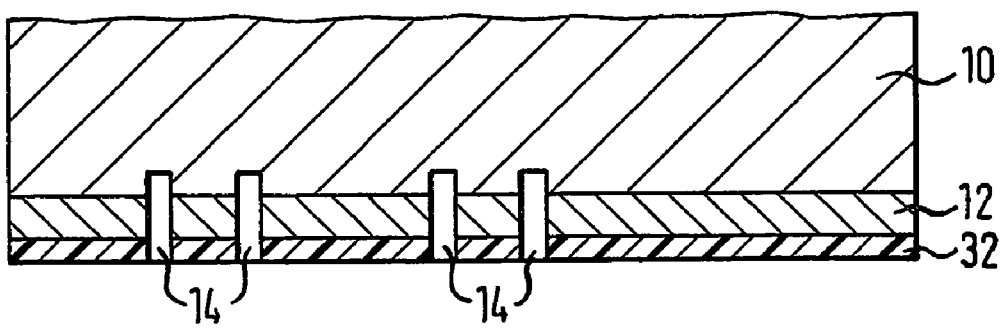
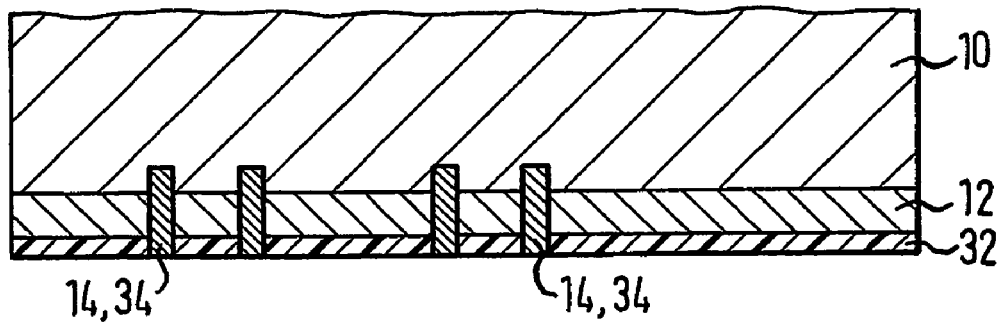
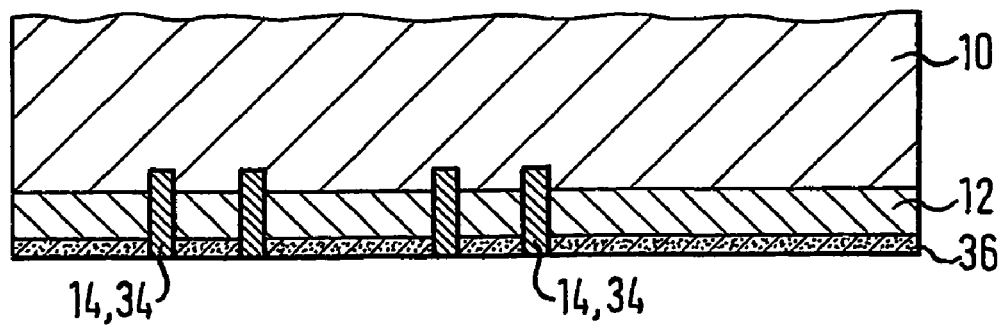

METHOD FOR MANUFACTURING AN ELECTRODE FOR THE ELECTROCHEMICAL MACHINING OF A WORKPIECE AND AN ELECTRODE MANUFACTURED ACCORDING TO THIS METHOD

FIELD OF THE INVENTION

This application claims priority to the filing date of German Patent Application Nos. 102 06 408.3 and 102 37 324.8, respectively filed on Feb. 15, 2002 and Aug. 14, 2002, as well as PCT Application No. PCT/EP03/01344 filed Feb. 11, 2003; the disclosure of each of said applications being incorporated herein in its entirety.

BACKGROUND OF THE INVENTION

Hydrodynamic fluid bearings are being increasingly used, for example, in rapidly rotating hard disk drives instead of roller bearings, due among other things to their low-noise level and shock resistance. Hydrodynamic fluid bearings, also called fluid dynamic or hydrodynamic bearings (or journal bearings), consist of at least one stationary and one rotating component whose active surfaces are separated from each other by a space filled with a lubricant, preferably oil.

To build up hydrodynamic pressure in the bearing space, at least one of the bearing surfaces has a groove or trench-like pattern formed in it. Due to the relative rotary movement of the component surfaces affecting each other, a kind of pump effect is created allowing a uniformly thick and homogeneous film of lubricant to be formed which is stabilized by appropriate zones of hydrodynamic pressure.

By means of such hydrodynamic bearings, for whose manufacture the invention finds application, the extremely precise rotation of a moving rotor, driven by an electric motor and with a high speed compared to a stationary stator, can be achieved.

In one embodiment, such a fluid bearing consists of a shaft with a thrust plate, a sleeve surrounding the shaft, a counter plate built up as a counter bearing attached to the sleeve. Depending on whether the shaft is stationary or moves, at least one of the surfaces of the thrust and/or counter plate and of the shaft or the sleeve has an appropriate grooved or trench-like pattern which can be formed by the electrode used in the present invention through electrochemical machining.

In the prior art it was previously known to form the groove pattern by mechanically removing material from the precision pre-machined surface of the bearing or by plastic deformation of the surface. In both methods, the material along the groove or other feature is removed and displaced using a mechanical process. The disadvantage of this mechanical machining process is that the removal or displacement of the material results in small eruptions of material along the edges of the feature which finally have to be removed in a relatively costly and difficult finishing process.

Here it should be noted that the grooves in hydrodynamic fluid bearings are very small and filigree and have to be formed with extreme precision, in the range of 1 to 2 µm.

Alongside the viscosity of the lubricant and the thickness of the lubricating film, the formation of these grooves are significant for the stiffness of the hydrodynamic bearing. Any variations in dimensions due to a lack of precision in forming the groove pattern result in pressure differences or pressure deviations and directly impair the precise running of the motor.

To achieve the highest possible bearing stiffness, efforts are made to minimize the thickness of the lubricating film. This leads to the requirement that the bearing space, that is the distance between the opposing bearing surfaces, be as small as possible. It is therefore absolutely essential that the grooves are formed with the utmost precision and with the lowest possible tolerances and in particular without the pile up of any material along the edges.

As well as describing the mechanical machining of the surfaces of hydrodynamic fluid bearings, DE 199 50 463 A1 also describes an alternative kind of machining in which the surface of a fluid bearing is coated and the desired features are formed in the coating by a beam of energy, in particular a laser beam.

An electrochemical method of forming grooves on the surface of a hydrodynamic fluid bearing is described in U.S. Pat. No. 6,267,869 B1. This document is based on a prior art in which the structured surface of a hydrodynamic bearing is formed by electrochemical etching whereby the electrode and the bearing surface are immersed in a salt solution, a difference in potential is created and the movement of the electrode defines the desired features and, in the way of a paintbrush, forms the surface. Although this process avoids the problem of material pile up along the edges of the grooves, it is still very slow and costly.

Consequently, U.S. Pat. No. 6,267,869 B1 suggests the use of a wide-coverage electrode that essentially covers the entire surface of the fluid bearing and which has appropriate grooves formed in it which mirror the grooves to be formed in the bearing surface. The workpiece and electrode are placed in a container filled with electrolyte and set at a precisely defined distance to each other.

By setting up a potential difference whereby the workpiece is connected as an anode and the tool electrode as a cathode, an electrochemical etching process is created.

While the electrolyte flows between the two electrodes, atom by atom is dissolved from the surface of the workpiece in accordance with Faraday's Law. Here, the weight of the dissolved metal is equivalent to the amount of electricity exchanged between cathode and anode.

With this method, described in the industry by such companies as "Extrude Hone", Irwin, Pa., USA or "Loadpoint Ltd." from Swindon, Wiltshire, UK, as ECM (Electro Chemical Machining) or EMM (Electro Micro Machining), the complete set of grooves on the surface of a shaft, sleeve or counter plate etc. can be formed in one processing step by fashioning the desired groove pattern, which is to be formed on the bearing surface, on the surface of the tool electrode.

In U.S. Pat. No. 6,267,869 B1 it is described that the tool electrode can be formed by mechanical machining and although the problem of material pile up can again occur here, due to the repeated use of the electrode the cost of post-machining can be relativized. After mechanical machining, the tool electrode is embedded in an insulating plastic substance, for example in a two-component resin, to ensure that the transport of electrical charges only takes place in the area of the "active", that is the free electrode surface, otherwise the surrounding surfaces could be undesirably etched due to parasitic charge exchange.

Reference is made to U.S. Pat. No. 6,267,869 B1 particularly to the extent that it applies to the use of the electrode in forming the bearing surfaces.

In the method described above for manufacturing a tool electrode to form grooves on a hydrodynamic fluid bearing, the problem still exists that the manufacture of such electrodes is time consuming and cost intensive, particularly when microfeatures are to be formed with high precision and the surface of the electrode is curved. The risk of damaging such electrodes is very high even with careful handling. The structured electrode surface is made of e.g. copper, brass, aluminum or nickel which are relatively soft and thus easy to damage mechanically. Due to the high electrical current the electrolyte heats up to 80° C. to 100° C. which can place considerable thermal strain on the electrode, and due to the different thermal expansion coefficients of the metallic electrode material and the insulating plastic, a loosening of the bond and final breaking or splitting of the insulation occur.

With an electrode of the said art, as a rule no more than about 50,000 surfaces can be machined which corresponds to less than one day's production. According to its nature, each electrode is unique and due to the mechanical machining of the electrode surface, the duplication of its surface structure is only possible within specific work tolerances.

Consequently, it is the object of the invention to provide a method for manufacturing an electrode of the art described above as well as an appropriate electrode, which overcomes the problems described and particularly by which an electrode can be manufactured with high precision and reproducibility at a low cost.

SUMMARY OF THE INVENTION

The present invention provides a method of manufacturing an electrode for the electrochemical machining of a workpiece, particularly a workpiece with a patterned surface for a fluid bearing with the following processing steps:

(a) Providing an electrode body made of a conductive base material which has an essentially smooth surface;

(b) Covering the surface with an insulating layer, (c) Partial exposure of the basic electrode body by removing the insulating layer whereby a pattern is formed which corresponds to the pattern to be formed on the surface of the workpiece by means of the electrochemical machining.

In the method according to the invention for manufacturing an electrode for the electrochemical machining of a workpiece, particularly for structuring the surface of a fluid bearing, an electrode body made of a conductive base material is initially provided which has an essentially smooth surface. In one embodiment, the base material can be copper and can be coated with a layer of aluminum. In another embodiment, the electrode body can be made directly of aluminum or mostly of aluminum. Appropriate copper and aluminum alloys can also be used. In general, suitable materials are aluminum, copper and alloys made from aluminum and/or copper. Such alloys are e.g. copper beryllium (Cu Be), conductive bronze (Cu Cr Be) or wolfram carbide (WC, $W_2C$) or other well conducting metals having a sufficient, preferably high strength.

The surface of the electrode body is subsequently coated with an insulating material, preferably inorganic, whereby the insulating material is particularly a ceramic layer or ceramic-like layer. The ceramic layer is applied to the surface of the electrode material preferably by epitaxial growth, which means it is useful if the surface is made of aluminum or coated with aluminum as explained below in detail. In general, all high quality insulating materials (including organic materials) can be used as insulating materials as long as they can be deposited on the base material with a uniform coating thickness, are sufficiently stable and wear resistant and can be processed by a laser to form exact edges. Further criteria for selecting the insulating material is a good bond to the base material and a high temperature resistivity. These criteria are met in particular by silicon oxide and other oxide ceramic coatings. These materials can be applied by sputtering, CVD plasma coating, by means of sol gel technology, or other suitable technology.

After this, the insulating material is removed from the locations on the surface of the electrode body which conform to the features which are to be formed on the surface of the workpiece through electrochemical machining. This can be effected particularly by laser machining whereby the laser preferably penetrates through the ceramic or insulating layer down to the surface of the electrode body which lies beneath the said locations, and also removes a part of the basic material. For the patterning of the insulating material a c.w. laser source, a short pulse laser source, such as a pico second laser, or any other suitable laser can be used.

In the manner described above, a trench pattern is formed in the insulating material that lies above the surface of the electrode body which reaches at least down to the surface of the electrode body and which conforms to the features that are to be formed later through the electrochemical machining of the surface of the workpiece by means of this electrode.

The trenches, which form a mirror image of the later workpiece surface, are preferably filled with a highly conductive material such as nickel, copper or aluminum. This material can be deposited on the "active" electrode surface, which has been freed of the insulating ceramic layer, through a chemical or electrochemical process. However, the electrode is functional even if the trenches are not filled.

The present invention also provides an electrode for the electrochemical machining of the surface of a workpiece with an electrode body made of a conductive base material which is entirely covered with ceramic-like layer, a ceramic layer or an oxide ceramic layer in which, by partially exposing the electrode body, a kind of trench pattern is formed which corresponds to the pattern which is to be formed on the surface of the workpiece by electrochemical machining.

The invention has the advantage that the desired features can be formed on the electrode surface reproducibly and with high precision. In particular, by using a laser to remove the ceramic layer, precise contours can be formed in a controlled and reproducible manner. Whereas metal, for example, is first liquefied during laser machining and then forms a gas making it difficult to form precise edges, ceramics immediately turn into a gas allowing exact contours to be formed. Moreover, using the said method, an electrode can be produced that has a wear-resistant, level surface which is essentially formed by the hard, wear-resistant ceramic layer which particularly, when the trenches are filled with the conductive material, in turn forms a level surface and thus one with better fluidic properties without mechanical points of impact that, in addition, is resistant to wear and tear.

Compared to the prior art, the formation of the features on the electrode surface by means of laser machining can be more easily and better controlled than with mechanical machining as for example in accordance with U.S. Pat. No. 6,267,869 B1. Since the metal surface of the electrode is not directly machined, but rather an insulated ceramic layer which covers the entire metal surface of the electrode in order to then expose the desired features, it is possible to use a laser in a controlled way for this purpose. The combination of the hard, wear resistant ceramic layer and the filled trenches results in a smooth electrode surface which is relatively insensitive to mechanical influences. The insulating ceramic material fulfils the dual function of electrically separating the "active" electrode faces and at the same time mechanically protecting the electrode surface.

Mechanical finishing due to the pile up of material or similar is not necessary.

The trenches which are preferably at least partially filled with a conductive material, can additionally be coated with a precious metal such as silver, gold or platinum to protect the metal in the trenches against oxidation.

The electrode according to the invention can be produced with much greater precision in comparison with the prior art. Since the ceramic layer, created by the transformation of a part of the aluminum layer which covers the electrode surface, forms an homogeneous bond with the remaining, non-transformed aluminum layer, the bonding of the ceramic layer to the aluminum is stable even at higher temperatures (up to 300° C.); detachment as observed, for example, with a two-component epoxy resin does not take place.

According to an alternative embodiment, the surface of the electrode body is not initially coated with a ceramic material, but rather with another insulating material, for example a layer of plastic, in particular a photoresist coat. In this plastic layer, for example, using a known method, such as etching or laser machining or through a photoresist technique, a trench pattern is formed which is built up as described above and which is then filled with a highly conductive material. After the trenches have been filled, the plastic layer is removed and replaced with a hard, wear-resistant ceramic material or ceramic-like material, so that in the end effect, the same features as described above are created.

The invention also includes an electrode for electrochemically machining the surface of a workpiece as well as a method for manufacturing a hydrodynamic fluid bearing using such an electrode.

Perferred embodiments of the invention are defined in the dependent claimes.

BRIEF DESCRIPTION OF THE DRAWINGS

The invention is described in more detail below on the basis of preferred embodiments with reference to the drawings, whereby:

FIG. 3A to 3G show seven steps of an alternative method for manufacturing an electrode according to the invention;

FIG. 4A to 4D show four steps in a further embodiment for manufacturing an electrode according to the invention.

DETAILED DESCRIPTION OF PREFERRED EMBODIMENTS

FIG. 1A to 1D show in a severely simplified form an embodiment of the method used in the invention for manufacturing an electrode according to the invention, which can be used for the electrochemical machining of the surface of a workpiece.

This method assumes an electrode body 10 whose size and external shape is adapted to the surface of the workpiece which is to be machined later, for example, the surface of a hydrodynamic fluid bearing. In the alternative methods described here, the electrode body 10 is made of aluminum or a common aluminum alloy such as AlMgSi.

However, another highly conductive metal such as copper could also be used.

Figure 1A:
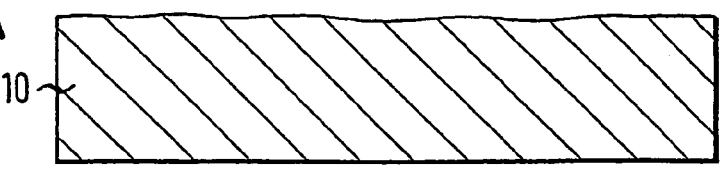
FIG. 1A to 1D show a schematic view of four processing steps in the manufacture of an electrode according to the invention.
Figure 1B:
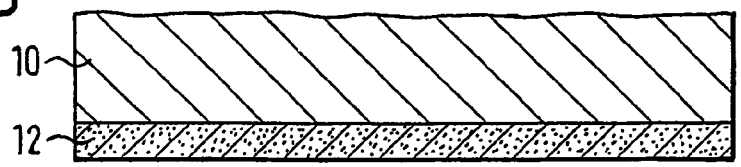

The main factor in the choice of material is that the surface of the electrode body 10 is conducive to being coated with a thin but hard and wear resistant ceramic or ceramic-like layer which is particularly well insulating. FIG. 1B shows an electrode body 10 covered with a ceramic layer e.g. with $Al_2O_3'$. In practice, the ceramic layer can resemble, for example, a HART-COAT® layer which is sold by AHC Oberflächentechnik GmbH & Co. OHG, Ebersbach/Fils, Germany. HART-COAT® is a hard-anodic oxidation which is generally used to protect aluminum materials from wear and tear and from corrosion by forming a hard ceramic layer. HART-COAT® layers are built up on aluminum through anodic oxidation in an acid electrolyte; in this process, the surface of the basic aluminum material is transformed with the help of an electric current into a protective aluminum oxide layer, whereby due to the increase in volume of a part of the aluminum layer during transformation, the ceramic layer created is deposited in part onto the original surface and partly diffuses into the basic material.

The invention is clearly not restricted to the HART-COAT® layer described, but includes all wear resistant insulating materials, in particular ceramic and ceramic-like layers and in particular those which are suitable for being deposited on preferred conductive metals, such as aluminum or aluminum alloys.

Figure 1C:
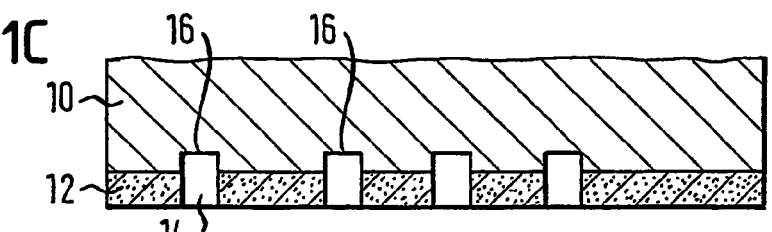
Figure 1D:
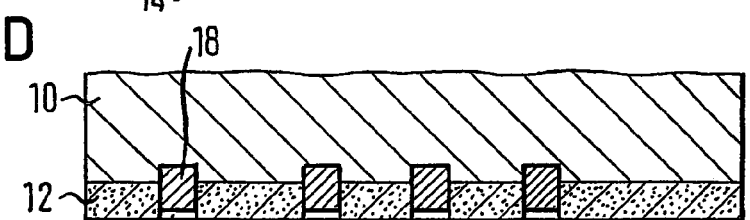

After the ceramic layer 12 has been built up, a trench pattern 14 is formed in this layer as shown in FIG. 1C, by partial removal of ceramic material, for example, by laser machining, whose shape conforms to a pattern which is later to be formed in the surface of the workpiece by electrochemical machining. The trenches in the trench pattern 14 are formed at least as deep so as to fully remove the ceramic layer 12, the depth is preferably greater than the thickness of the ceramic layer so that at least a part of the electrode body is also removed. This is to ensure that the highly conductive material of the electrode body, such as copper or aluminum is exposed in order to form "active" electrode locations 16. FIG. 1C shows a fully functioning electrode with electrode locations 16 which can be used for the electrochemical machining of the surface of a workpiece.

Preferably, however, the trench pattern 14 is refilled with a highly conductive material 18 such as copper, nickel or aluminum in order to increase the efficiency of the finished electrode and to improve the mechanical stability of the electrode surface and to minimize the current resistance of the electrode for the ECM process. Whereas in FIG. 1D the highly conductive material 18 does not entirely fill the trench 14, for another embodiment the surface of the electrode can be completely level by either the trench 14 being entirely filled with highly conductive material 18 or, for example, a finishing layer of gold, or the electrode surface can be machined and leveled.

The conductive material 18, such as copper, nickel or aluminum is preferably deposited at the electrode locations 16 in the trench 14 chemically and/or electrochemically. For this purpose, the currentless electroplating method offered by AHC Oberflächentechnik and known under the name DURNI-COAT® would be suitable for example. It is clear that all methods of chemical or electrochemical coating using highly conductive materials such as copper, nickel, gold etc. lie within the sphere of the invention, this also applies to the combination of chemical and electrochemical coating methods.

Figure 2A:
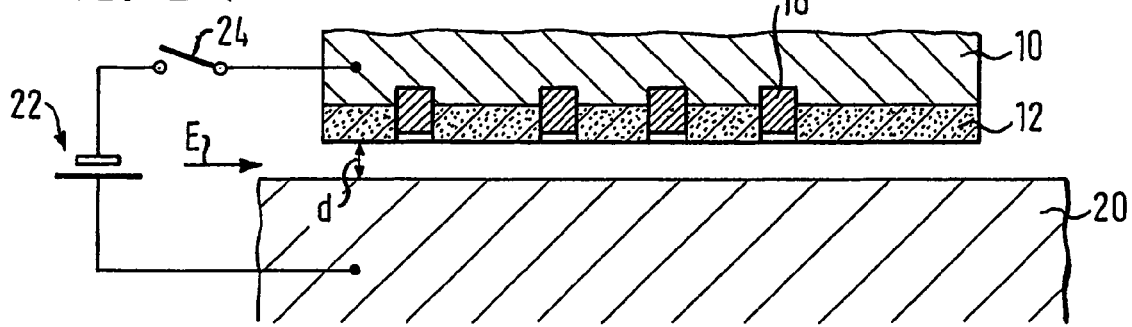
FIG. 2A and 2B show a workpiece whose surface is electrochemically machined with the electrode in FIG. 1D, before and after machining.
Figure 2B:
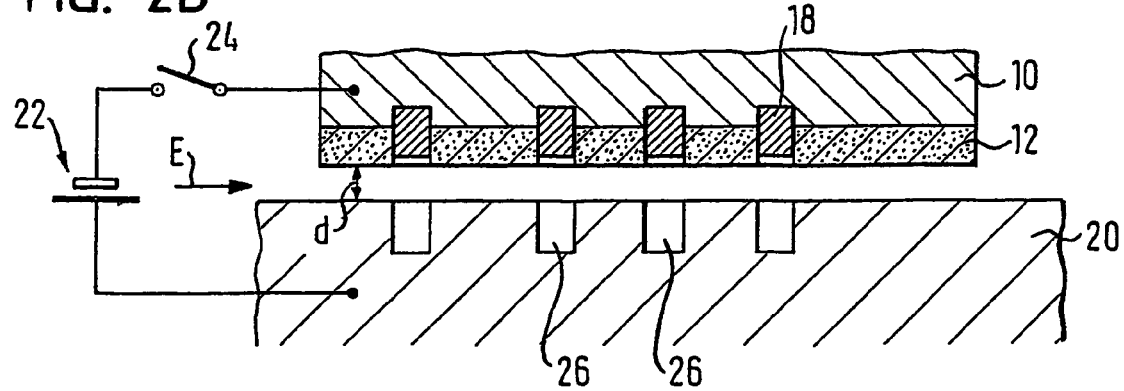

FIGS. 2A and 2B show how a workpiece 20 is machined with the electrode used in the invention. The workpiece 20 is made, for example, of steel, preferably non-rust stainless steel and has an essentially smooth surface in which, for example, a groove pattern for a hydrodynamic fluid bearing is to be formed. The trench pattern 14 is a mirror image of the grooves 26 to be formed in the surface of the workpiece 20. The electrode is placed opposite the surface of the workpiece 20 where the grooves are to be formed and the workpiece 20 and electrode are held in an electrolyte bath immobile in relation to each other. The electrolyte current is identified by an arrow marked with an E. The unchanging distance between the electrode and workpiece 20 is marked with a d. Between the electrode and workpiece 20 a source of an electric direct current 22 is connected and a direct current circuit is formed via a time or charge controlled switch 24. Through the charge flow in the electrolyte, an ion exchange (charge flow) takes place between the tool electrode and workpiece 20. As a consequence, the material of the workpiece is dissolved atom by atom from the workpiece surface at the places lying opposite the "active" electrode locations taking part in the charge flow, so that the grooves shown in FIG. 2B are finally formed. This groove pattern 26 is a mirror image of the "active" electrode face, which means the electrode surface which is not covered by an insulating layer, and thus conforms to the original trench pattern 14 of the tool electrode.

The depth "t" of the grooves 26 depends on the various process parameters of the ECM method used and is essentially proportional to the transported electrical charge.

A further embodiment of the method for manufacturing an electrode according to the invention is shown schematically in FIG. 3A to 3G.

FIG. 3A shows a detail of an electrode body 10 made of copper before and after surface machining which served to give the electrode body the correct dimensions, surface composition etc. In FIG. 3B an aluminum layer 11 is shown on the copper electrode body 10 which could, for example, be a plated aluminum layer as described in EP 0 048 406 A2 in a different context. In an electroplating process, a thin layer of "plated aluminum" is precipitated on the copper body. Such processes are also offered, for example, by Rasant-Alcotec Beschichtungstechnik GmbH, Overath, Germany.

As shown in FIG. 3C, a part of this plated aluminum layer 11 is transformed using one of the methods described above into an insulating ceramic layer ($Al_2O_3$) or a ceramic-like layer 12. This process is linked to an increase in volume whereby the thickness of the entire layer consists of a part deposited onto the surface (approx. 30-50%) and a "penetrating" part diffusing into the surface (70-50%). As shown in FIG. 3D, the coated surface is subsequently machined, for example, with a laser beam in order to form a trench pattern in which the material of the basic body 10 is exposed. As described above, this trench pattern 14 forms a mirror image of the features to be formed later in the workpiece.

As shown in FIG. 3E, the trenches 14 are then filled preferably with a highly conductive material, copper in the illustrated embodiment, whereby nickel, aluminum or suchlike could be chosen. In filling the trenches a currentless chemical deposition process is preferably used as this method ensures a particularly even application of the material without forming edges. It is clear, however, that there are other methods for applying the copper, in particular electrochemical methods within the sphere of the invention. The "filling" in the trenches 14 can be less than the trench depth, the same as the trench depth or higher than the trench depth depending on the desired embodiment of the electrode. This as been schematically illustrated in FIG. 3E by two different trench fillings 18.

FIG. 3F shows that a finishing coat 30, for example of gold, platinum or another precious metal, is then applied to the highly conductive material 18 which fills the trenches 14. This finishing coat 30 is optional and can particularly prevent the "active" locations of the electrode from oxidizing.

The finished electrode can then be subsequently processed as shown in FIG. 3G, e.g. ground level, impregnated or worked in some other manner particularly to create a perfectly level and very hard electrode surface, which is extremely wear resistant and which has very low current resistance.

Finally, FIG. 4A to 4D show a further embodiment of the method for manufacturing an electrode according to the invention.

In FIG. 4 based on an aluminum layered basic electrode body 10, which can be manufactured and pre-machined as described above, an organic layer 32, preferably photoresist, is evenly applied to the outside of the electrode on which the trench pattern is to be formed. The electrode body can, of course, be made entirely of aluminum or an aluminum alloy and the basic body 10 can also be made of another suitable material other than copper, whereby this, of course, also applies to the other embodiments described above.

As shown in FIG. 4B, using laser machining, for example, a trench pattern 14 is formed, penetrating through the resist coating 32 and the aluminum layering 12 into the electrode body 10 coated in this manner, which just as in the embodiments described above penetrates the layers until the basic body 10 of the electrode.

These trenches 14 are filled with a highly conductive material 34, such as copper or nickel for example, using one of the methods described above, whereby the filled trenches 34, 14 form the active locations of the later electrode, see FIG. 4C.

The photoresist coat 32 is subsequently removed and the spaces between the filled trenches 14, 34 are "filled up" by the deposit of a ceramic layer 36 or a ceramic-like layer, particularly according to one of the methods describe above, so that finally a pattern as shown in FIG. 3D is formed.

It is clear that subsequent machining and finishing work as described above for leveling the electrode surface, sealing it etc. can follow.

The features revealed in the above description, claims and figures could be of importance in realizing the invention in its different embodiments either individually or in any combination.

The invention claimed is:

1. A method for manufacturing an electrode for electrochemical machining of a workpiece, comprising:
    (a) providing an electrode body made of a conductive base material having a smooth surface;
    (b) covering the smooth surface with an insulating layer;
    (c) at least partially exposing the electrode body by removing the insulating layer to form a pattern, the pattern having at least one trench and corresponding to a desired pattern to be formed on a workpiece by electrochemical machining;
    (d) wherein the trench is at least partially filled with a conductive material and the trench is formed in the electrode body.

2. The method of claim 1, wherein the base material further comprises copper.

3. The method of claim 1, further comprising coating the surface of the electrode body with an aluminum layer prior to Step (b).

4. The method of claim 1, wherein the base material further comprises aluminum.

5. The method of claim 1, wherein the conductive material is deposited in the trenches using a chemical or an electrochemical process.

6. The method of claim 1, wherein the conductive material is further comprises copper, nickel or aluminum or a combination thereof.

7. The method of claim 1, wherein the insulating layer further comprises a wear-resistant ceramic-like layer.

8. The method of claim 7, wherein the ceramic-like layer is formed by a partial transformation and deposit of aluminum.

9. The method of claim 1 wherein the step of at least partially exposing the electrode body is effected by laser machining.

10. The method of claim 9, wherein the laser machining removes a part of the surface of the electrode body.

11. The method of claim 1, further comprising coating a surface of the electrode body in Step (b) with a plastic layer.

12. The method of claim 11, further comprising partially removing the plastic layer using a solvent or through laser machining.

13. The method of claim 11, further comprising removing the plastic layer after the trenches have been filled with the conductive material.

14. The method of claim 13, wherein after removing the plastic layer, the surface of the electrode body in the space between the trenches is covered with a wear-resistant ceramic-like insulating layer.

15. An electrode formed by the method of claim 1.

16. An electrode comprising a conductive electrode body with an insulating layer thereon; the electrode body having a pattern defined by at least one trench, the pattern corresponding to a desired pattern to be formed on a workpiece through electrochemically machining the workpiece, wherein the at least one trench is formed in the electrode body, and wherein the trench is at least partially filled with a conductive material.

17. The electrode according to claim 16, wherein the electrode body is made of an aluminum material or is coated with an aluminum material.

18. A tool for machining a surface of a hydrodynamic fluid bearing defined by an electrode according to claim 16.

19. The electrode according to claim 16, wherein the insulating layer is a ceramic layer.

20. The electrode according to claim 16, wherein the insulating layer is an aluminum oxide ceramic layer.

21. The electrode according to claim 16, wherein the pattern is formed by electrochemical machining.

22. The electrode according to claim 16, wherein the pattern is formed by a laser.

23. The electrode according to claim 16, wherein the desired pattern defines at least one trench to be formed on the workpiece.

24. The electrode according to claim 16, wherein the conductive material is coated with a precious metal.

25. The electrode according to claim 24, wherein the precious metal is selected from the group consisting of gold, silver and platinum.

26. The electrode according to claim 16, wherein the trench is fully filled with a conductive material.

27. The electrode according to claim 26, wherein the filled trench forms a uniform, non-stepped surface.

28. The electrode according to claim 26, wherein the filled trench forms a stepped-stepped surface.

* * * * *